US007703256B2

(12) United States Patent
Haddock

(10) Patent No.: US 7,703,256 B2
(45) Date of Patent: Apr. 27, 2010

(54) MULTI-PIECE ATTACHMENT MOUNTING CLAMP FOR TRAPEZOIDAL RIB PROFILE PANELS

(76) Inventor: Robert M. M. Haddock, 8655 Table Butte Rd., Colorado Springs, CO (US) 80908

( * ) Notice: Subject to any disclaimer, the term of this patent is extended or adjusted under 35 U.S.C. 154(b) by 1136 days.

(21) Appl. No.: 10/823,410

(22) Filed: Apr. 13, 2004

(65) Prior Publication Data

US 2005/0217203 A1 Oct. 6, 2005

Related U.S. Application Data

(63) Continuation-in-part of application No. 10/818,469, filed on Apr. 5, 2004, now abandoned.

(51) Int. Cl.
*E04D 1/34* (2006.01)
(52) U.S. Cl. ................ 52/543; 52/24; 52/463; 52/782.1
(58) Field of Classification Search ............. 52/584.1, 52/463, 24, 25, 26, 782.1, 545, 542, 543, 52/544, 546, 547, 698; 269/45, 239; 248/71, 248/226.11, 228.1, 228.5, 231.61; 403/168, 403/256, 388, DIG. 9
See application file for complete search history.

(56) References Cited

U.S. PATENT DOCUMENTS

| 1,465,042 | A | 8/1923 | Hruska | |
| 1,511,529 | A | 10/1924 | Standlee | |
| 1,735,937 | A | 11/1929 | Shaffer | |
| 2,340,692 | A | 2/1944 | Ridd | 18/18 |
| 3,039,161 | A | 6/1962 | Gagnon | 24/263 |
| 3,307,235 | A | 3/1967 | Hennings | 24/243 |
| 3,503,244 | A | 3/1970 | Joslin | 72/317 |
| 3,590,543 | A | 7/1971 | Heirich | 52/298 |
| 3,817,270 | A | 6/1974 | Ehrens et al. | 137/318 |

(Continued)

FOREIGN PATENT DOCUMENTS

FR 2638772 5/1990 ............. 13/10

(Continued)

OTHER PUBLICATIONS

U.S. Appl. No. 10/746,546, filed Dec. 23, 2003, Haddock.
U.S. Appl. No. 10/746,596, filed Dec. 23, 2003, Haddock.

*Primary Examiner*—Richard E Chilcot, Jr.
*Assistant Examiner*—William V Gilbert
(74) *Attorney, Agent, or Firm*—Marsh Fischmann & Breyfogle LLP

(57) ABSTRACT

A clamp (42) is mounted on a hollow rib (18) of a panel assembly (142). The clamp (42) includes a first clamping member (46) and a separate second clamping member (82). The first clamping member (42) includes a first section (50) that is disposed beyond a top wall (30) of the rib (18), and that includes an arcuately-shaped recess (58). The second clamping member (82) includes a convex, arcuately-shaped distal end (90) that is disposed within the recess (58) of the first clamping member (42) to allow the second clamping member (82) to pivot relative to the first clamping member (46) at least generally about the distal end (90) to secure the clamp (42) to the rib (18). An attachment (150) may be mounted on the clamp (42).

43 Claims, 11 Drawing Sheets

U.S. PATENT DOCUMENTS

| | | | |
|---|---|---|---|
| 3,904,161 A | 9/1975 | Scott | 48/541 |
| 3,986,746 A | 10/1976 | Chartier | 294/116 |
| 4,200,107 A | 4/1980 | Reid | 128/305 |
| 4,261,384 A | 4/1981 | Dahlbring | 137/318 |
| 4,467,582 A * | 8/1984 | Hague | 52/478 |
| 5,176,462 A * | 1/1993 | Chen | 403/252 |
| 5,222,340 A * | 6/1993 | Bellem | 52/463 |
| 5,271,194 A | 12/1993 | Drew | 52/25 |
| 5,479,752 A | 1/1996 | Menegoli | 52/549 |
| 5,609,326 A | 3/1997 | Stearns et al. | 256/12.5 |
| 5,613,328 A | 3/1997 | Alley | 52/25 |
| 5,715,640 A | 2/1998 | Haddock | 52/545 |
| 5,732,513 A | 3/1998 | Alley | 52/25 |
| 6,119,317 A | 9/2000 | Pfister | 24/514 |
| 6,385,914 B2 | 5/2002 | Alley | 52/25 |
| 6,602,016 B2 * | 8/2003 | Eckart et al. | 403/110 |
| 7,127,852 B1 * | 10/2006 | Dressler | 52/24 |
| 2002/0088196 A1 * | 7/2002 | Haddock | 52/543 |

FOREIGN PATENT DOCUMENTS

| | | | |
|---|---|---|---|
| JP | 5-346055 | 12/1993 | 13/10 |
| JP | 9-256562 | 9/1997 | |
| WO | WO 99/55982 | 11/1999 | |

* cited by examiner

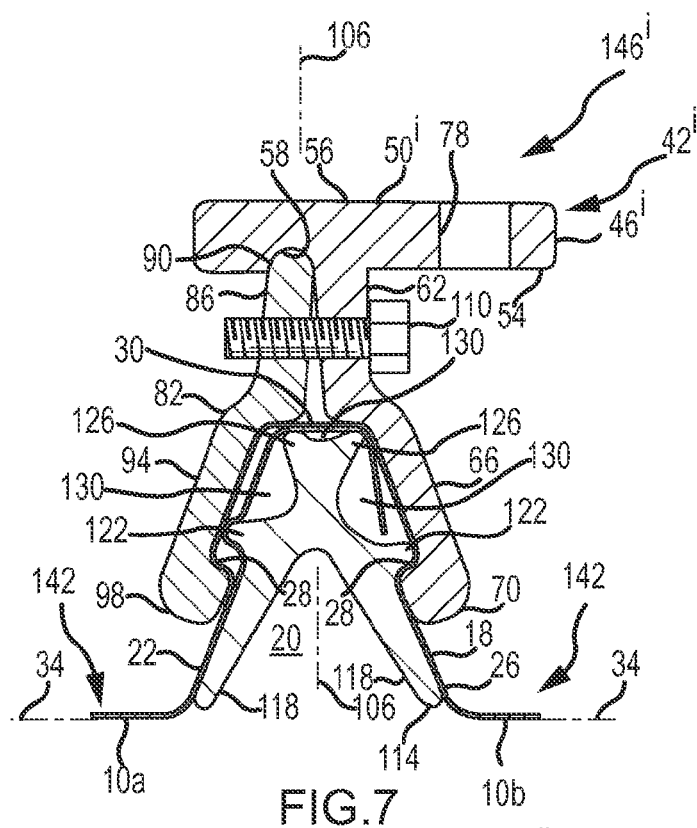
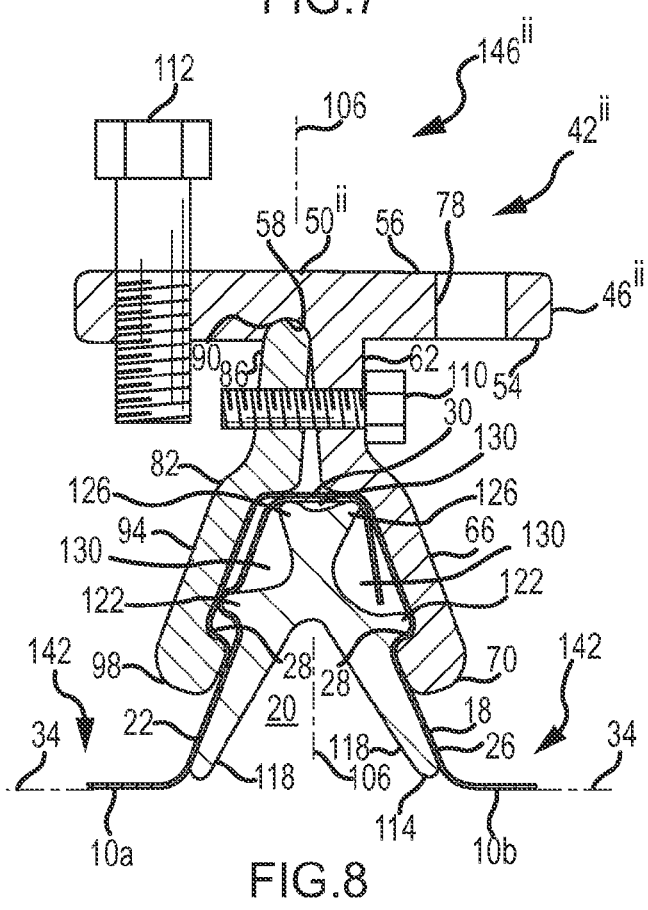

US 7,703,256 B2

MULTI-PIECE ATTACHMENT MOUNTING CLAMP FOR TRAPEZOIDAL RIB PROFILE PANELS

CROSS-REFERENCE TO RELATED APPLICATIONS

This patent application is a continuation-in-part of, and claims priority under 35 U.S.C. §120 to, U.S. patent application Ser. No. 10/818,469, that was filed on Apr. 5, 2004, now abandoned and that is entitled "MULTI-PIECE ATTACHMENT MOUNTING CLAMP FOR TRAPEZOIDAL RIB PROFILE PANELS."

FIELD OF THE INVENTION

The present invention generally relates to the field of panel assemblies that include a plurality of interconnected panels having a plurality of trapezoidal ribs disposed in spaced relation and, more particularly, to interconnecting an attachment to such a panel assembly using at least one clamp that is mounted on one or more of these ribs.

BACKGROUND OF THE INVENTION

Many structures utilize a roofing and/or siding surface that is defined by a panel assembly having a plurality of interconnected metal panels. Various configurations of metal panels are available for panel assemblies. One known metal panel configuration includes a raised trapezoidal rib having a hollow interior and that extends in a longitudinal dimension along the panel, as well as a pair of raised sides that are spaced in a lateral dimension. Appropriately interconnecting one side of one panel with one side of another panel defines another raised rib for the resulting panel assembly. There is oftentimes a need/desire to mount one or more attachments of various types to a particular roofing and/or siding surface. It would be desirable to have a clamp that could be installed on a panel assembly having panels of the above-noted type and to which an attachment could be mounted.

BRIEF SUMMARY OF THE INVENTION

The present invention generally relates to a clamp. One application of the present invention is to install a clamp on a rib of a panel assembly. The present invention will be discussed in relation to this particular application. In this regard, the present invention may be in the form of what may be characterized as a clamp/panel assembly that generally includes a clamp that is mounted on a panel assembly.

One component of the noted clamp/panel assembly is a panel assembly. The panel assembly includes a plurality of interconnected panels, a plurality of base sections, and a plurality of raised ribs. A first reference plane may be associated with the plurality of base sections. For instance, the plurality of base sections may be characterized as being disposed at least generally in this first reference plane. The plurality of ribs are disposed in spaced relation on the panel assembly and includes a first rib that is disposed between first and second base sections (of the same or different panels). The first rib includes a first sidewall that extends away from the first base section (e.g., upwardly from the first base section), as well as a second sidewall that extends away from the second base section (e.g., upwardly from the second base section). The first rib may also include a top wall that interconnects the first and second sidewalls and that is disposed in spaced relation to the first and second base sections. It would then be proper to characterize the first and second sidewalls of the first rib as disposing such a top wall in spaced relation to the first reference plane associated with the plurality of base sections. Each rib of the panel assembly may be of the same configuration as the first rib.

Another component of the noted clamp/panel assembly is a clamp. The clamp includes first and second clamping members. The first clamping member engages the first sidewall of the first rib (including all, but more typically only a portion thereof) and extends "beyond" the first rib (e.g., "above" the first rib). The second clamping member engages the second sidewall of the first rib (including all, but more typically only a portion thereof) and also extends beyond the first rib (e.g., "above" the first rib). Therefore, the first rib is located between opposing portions of the first and second clamping members. A first fastener is located beyond the first rib and is associated with both the first and second clamping members. Activation of at least this first fastener causes both the first and second clamping members to exert at least an inwardly-directed force on the first rib.

In a first aspect of the present invention, the second clamping member is pivotable relative to the first clamping member, including during activation of the noted first fastener to forcibly retain the clamp on the first rib. Any way of achieving a pivotable interconnection between the first and second clamping members may be utilized. In a second aspect of the present invention, the first clamping member includes a recess that is concave and arcuately-shaped, the second clamping member includes a first projection that is convex and arcuately-shaped, and the first projection of the second clamping member is disposed in the recess of the first clamping member. In a third aspect of the present invention, no nut is used in combination with the first fastener that is used to generate at least part of the "clamping" forces that retain the clamp on the first rib. In a fourth aspect of the present invention, an insert is disposed within a hollow interior of the first rib, and the clamp is mounted on the first rib in overlying relation to the insert such that the corresponding portion of the first rib is "sandwiched" between the clamp and the insert. Hollow rib profiles and clamp designs other than those described above may be used in relation to this fourth aspect, and the insert may be of any appropriate configuration as well. In a fifth aspect of the present invention, the first rib may be what is commonly referred to in the art as a trapezoidal-type (i.e., where the first and second sidewalls are disposed in non-parallel relation), but in any case has an indentation on at least one of its two sidewalls. At least one of the first and second clamping members of the clamp includes a head that is positioned within an indention on an exterior surface of its corresponding sidewall of the first rib. Other clamp designs having such a "head" may be utilized in relation to the fifth aspect as well.

Various refinements exist of the features noted in relation to each of the first through the fifth aspects of the present invention. Further features may also be incorporated in each of the first through the fifth aspects of the present invention as well. These refinements and additional features may exist individually or in any combination. Initially, the above-noted first, second, third, fourth, and fifth aspects may be used individually, and further may be used together in any combination.

The panel assembly of the clamp/panel assembly may be used for any appropriate application, for instance as a roofing surface or a siding surface for a building. Its plurality of panels may be of any appropriate configuration, and may be formed from any appropriate material and in any appropriate manner. Typically, each of the panels will be metal, and as noted above such ribs are what are commonly referred to in the art as a trapezoidal type in one embodiment. The first and second clamping members of the clamp also may be formed from any appropriate material and in any appropriate manner. However, preferably both the first and second clamping members are rigid structures (e.g., an extruded metallic structure).

Both the first and second clamping members include multiple sections in one embodiment. In this regard, the first clamping member may include first, second, and third sections. The first section may be disposed beyond the first rib and may be disposed in any appropriate orientation relative to the "underlying" panel assembly (e.g., at least substantially parallel with the above-noted first reference plane). The second section may extend from the first section toward the first reference plane in a different orientation than the first section (e.g., the first section may cantilever from the second section) and also may be disposed beyond the first rib. The third section may extend from the second section toward the first reference plane in a different orientation than the second section, and may engage all or any part of the first sidewall of the first rib. The second clamping member may further include fourth and fifth sections. The fourth section may be disposed beyond the first rib and may extend toward the first reference plane in one orientation, while the fifth section may extend from the fourth section toward the first reference plane in a different orientation and may engage all or any part of the second sidewall of the first rib. The second and third sections of the first clamping member may be at least generally the mirror image of the fourth and fifth sections of the second clamping member.

The first and second clamping members may include first and second heads, respectively. The first and second heads each may exert a force on a corresponding portion of the first and second sidewalls, respectively, of the first rib having a force component that is inwardly directed, that is directed toward a top wall of the first rib, or both. That is, the first and second heads each may attempt to both compress the first rib and "pull up" on an engaged portion of the first rib as well. In one embodiment, the first sidewall of the first rib is compressed between the first clamping member and the insert of the fourth aspect, while the second sidewall of the first rib is compressed between the second clamping member and this insert. Again, the insert of the fourth aspect is disposed within a hollow interior of the first rib. One or more open spaces may exist between the insert and the first rib, including after the desired degree of compressive force is being exerted on the first rib by the clamp. The insert may be formed from any appropriate material and in any appropriate manner (e.g., an extruded metallic structure), and may be of any appropriate configuration (including occupying all or any portion of the hollow interior of the first rib). However, preferably the insert is a rigid structure.

Lift-off resistance may also be provided by the above-noted first and second heads. In this regard, at least one of the first and second sidewalls of the first rib may include an indentation on an exterior surface of the first rib as noted above in relation to the fifth aspect. The above-noted first and second heads may extend into any corresponding indentation on the exterior surface of the first and second sidewalls, respectively, of the first rib. Any attempt by the clamp to move away from the panel assembly should then be resisted by the disposition of the first and/or second head into the corresponding indentation, if any, on the exterior surface of the first and second sidewalls, respectively of the first rib. It may be desirable to direct a threaded fastener through the first clamping member or the second clamping member and into the aligned portion of the first rib if the first rib only includes an indentation on the exterior surface of one of its two sidewalls. Such a threaded fastener could be directed through the first or second clamping member that did not have an indentation on the exterior surface of its corresponding sidewall. A head may not be needed on the first or second clamping member if there is not an indentation on the exterior surface of the corresponding first or second sidewall of the first rib.

In one embodiment, the above-noted first section of the first clamping member is at least generally parallel with the first reference plane that contains the plurality of base sections of the panel assembly to facilitate the mounting of an attachment thereon (other orientations may be appropriate as noted), and thereby may be in the form of a mounting flange. In this regard, the first section may include one or more threaded bores for use in mounting one or more attachments to the clamp or for any other purpose. Any such threaded bore may be pre-existing or may be formed during any mounting of an attachment(s) to the clamp (e.g., using self-drilling/self-tapping fasteners). The second clamping member may include a sixth section (e.g., extending from its fourth section) having one or more threaded bores of the type noted in relation to the first section of the first clamping member for mounting/supporting one or more attachments. In one embodiment, any threaded fastener used in relation to the first section of the first clamping member and/or the sixth section of the second clamping member does not use any retaining nut.

The first and second sections of the first clamping member may collectively define different configurations. One embodiment has the first and second sections of the first clamping member generally being in the form of an inverted "L-shaped" profile (with the first section extending away from a reference plane that bisects the first rib in either direction). Another embodiment has the first and second sections of the first clamping member generally being in the form of "T-shaped" profile. Any sixth section used by the second clamping member will typically be coplanar with the first section of the first clamping member. However, any sixth section of the second clamping member could be parallel with, but offset from, the first section of the first clamping member. Another option would be for any sixth section of the second clamping member and the first section of the first clamping member to be disposed in non-parallel relation.

In the case of the second aspect, a first projection of the second clamping member (e.g., a distal end of the second clamping member) is a convex, arcuately-shaped surface that is disposed within a recess of the first clamping member that is concave and that has an arcuately-shaped surface. This facilitates a pivoting or pivoting-like action of the second clamping member relative to the first clamping member to dispose the second clamping member in the desired position relative to the first clamping member. Other ways of allowing the second clamping member to pivot relative to the first clamping member are encompassed by the above-noted first aspect of the present invention. One or more threaded fasteners may be used to reduce the included angle between the first and second clamping members when mounting the clamp on the first rib, and to thereafter retain the second clamping member in the desired position relative to the first clamping member. For instance, an appropriate number of non-threaded bores (preferably two or more) may extend through the first clamping member at a location that is beyond the first rib (i.e., so that any such fastener does not engage the panel assembly), and a corresponding number of threaded bores may extend within or more preferably through an aligned portion of the second clamping member. Each threaded bore would have a corresponding non-threaded bore. A threaded fastener may then be directed through a non-threaded bore on the first clamping member and into an aligned threaded bore on the second clamping member. Increasing the degree of the threaded engagement between such a threaded fastener(s) and its corresponding threaded bore may be used to reduce the included angle between the second clamping member and the first clamping member (including reducing the same to "zero") to move the second clamping member into the desired position relative to the first clamping member (e.g., to pivot). In one embodiment, the non-threaded bores on the first clamping member are larger than the portion of the fastener directed therethrough to allow relative movement between the first clamping member and any such fastener in more than one dimension (i.e., in addition to the movement of the fastener(s) relative to the first clamping member along an axis while installing the threaded fastener(s)). Another option would be to direct each such fastener through a non-threaded, elongated slot (e.g., an aperture having a length dimension that is greater than its width dimension) in the first clamping member and into threaded engagement with the second clamping member. The "length" dimension of the slot may be disposed perpendicularly to the length dimension of the first rib on which the clamp is installed. What is preferred is that each fastener that is used to "draw" the clamp onto the first rib be allowed to move relative to the first clamping member without binding (e.g., be allowed to change its orientation relative to the first clamping member, as the first clamping member pivots relative to the second clamping member during installation). In any case, no retention nut need be used in relation to any of these types of fasteners.

BRIEF DESCRIPTION OF THE SEVERAL VIEWS OF THE DRAWING

FIGS. 7-9 illustrate variations of the clamp of FIG. 2.

DETAILED DESCRIPTION OF THE INVENTION

Figure 1A:
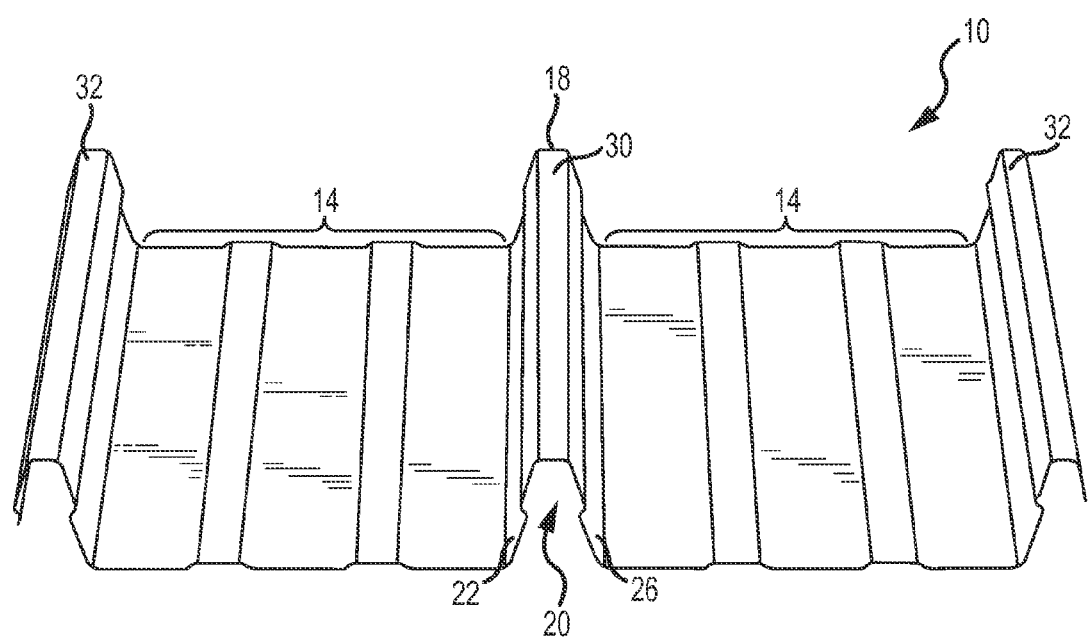
FIG. 1A is a perspective view of one embodiment of a prior art metal panel.
Figure 1B:
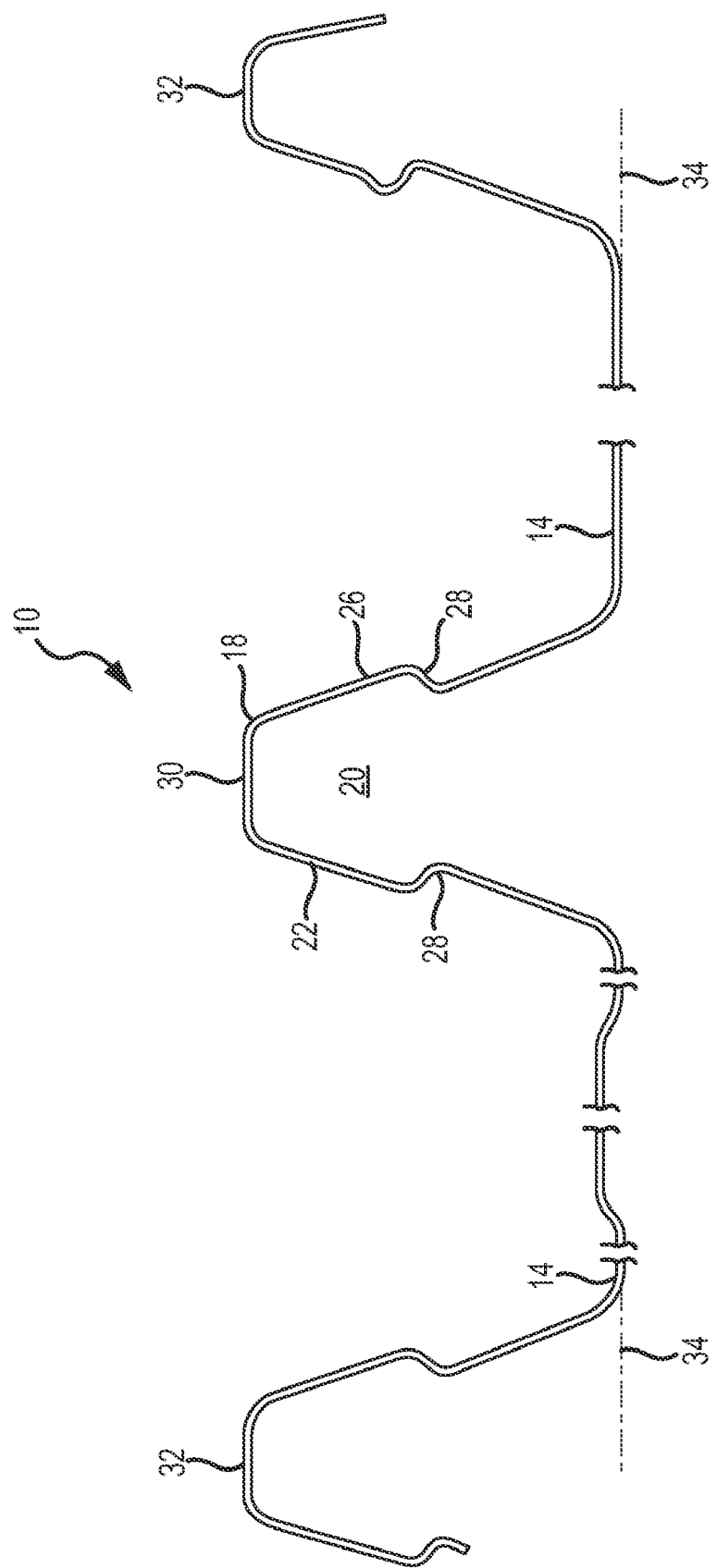
FIG. 1B is an end view of the metal panel of FIG. 1A.

The present invention will now be described in relation to the accompanying drawings which at least assist in illustrating its various pertinent features. One embodiment of a prior art panel is illustrated in FIGS. 1A-B and is identified by a reference numeral 10. The panel 10 includes a pair of base sections 14, a pair of sides 32, and a rib 18. A reference plane 34 is associated with these base sections 14 (e.g., contains at least a portion of each of the base sections 14). For a frame of reference, the width of the panel 10 or a lateral dimension corresponds with the distance between the two sides 32. Each side 32 may be interconnected with the side 32 of another panel 10 to define a panel assembly (e.g., FIGS. 4A-6). Interconnected sides 32 of adjacent, interconnected panels 10 also collectively define a rib 18 and as will be discussed/illustrated in more detail below. In this regard, each side 32 also projects upwardly from the adjacent base section 14 and has a length dimension that is perpendicular to the noted lateral dimension (e.g., defining a longitudinal dimension for the sides 32; the sides 32 thereby being longitudinally extending).

The rib 18 of the panel 10 is centrally disposed or located between the two sides 32 in the lateral dimension, projects upwardly from the base sections 14, and extends in the longitudinal dimension. Components of the rib 18 include a first sidewall 26 that extends upwardly from the adjacent base section 14, a laterally spaced second sidewall 22 that extends upwardly from the adjacent base section 14 and that is disposed in non-parallel relation with the first sidewall 26, and a top wall 30 that interconnects the first sidewall 26 and second sidewall 22 at a location that is disposed in spaced relation to the base sections 14 and the associated reference plane 34. The top wall 30 is flat and is at least substantially parallel with the reference plane 34 in the illustrated embodiment. Both the first sidewall 26 and the second sidewall 22 include an indentation 28 on an exterior surface of the rib 18. The first sidewall 26, the second sidewall 22, and the top wall 30 collectively define a hollow interior 20 for the rib 18. This type of rib profile is commonly referred to in the art as being of a trapezoidal type.

Figure 2:
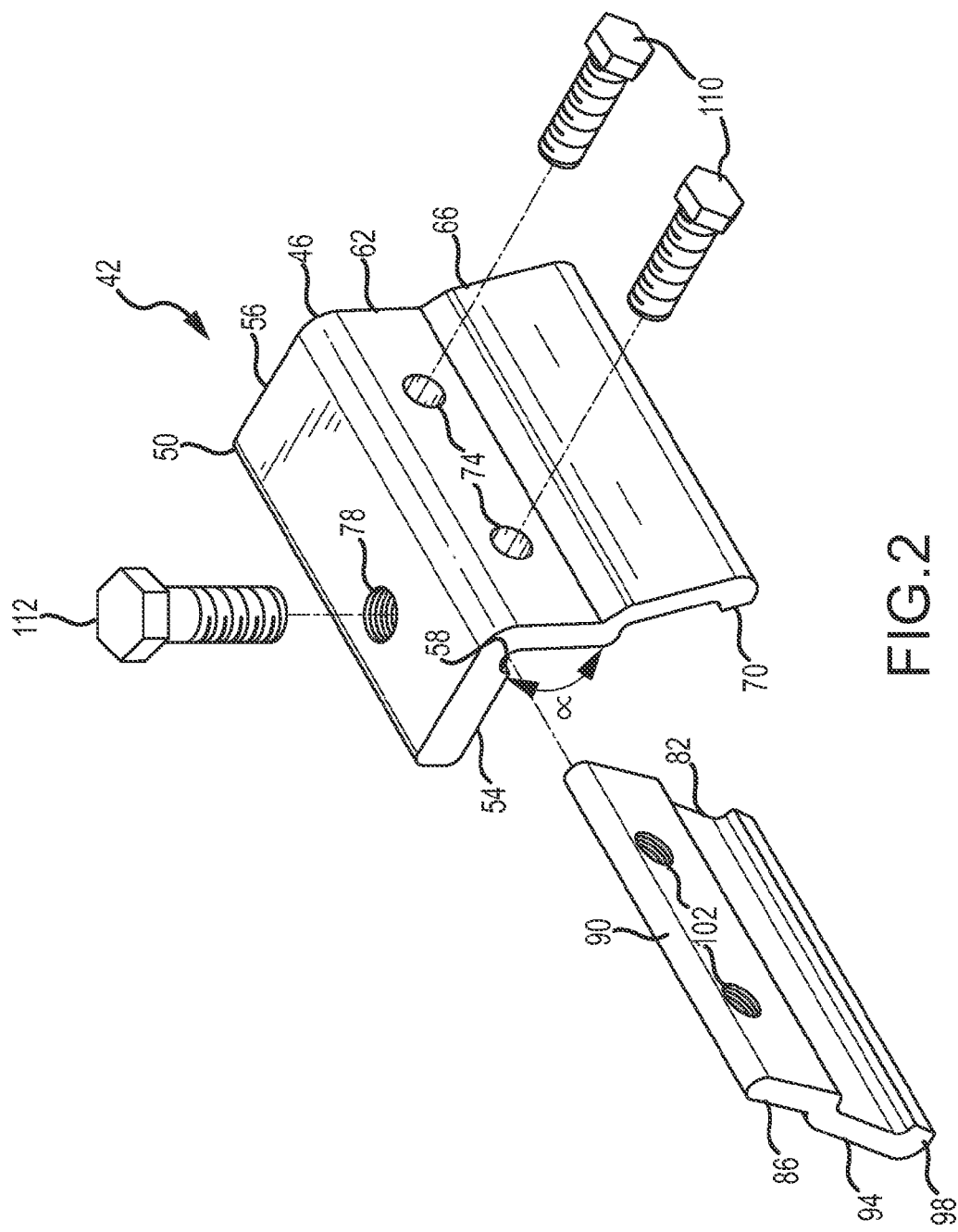
FIG. 2 is an exploded, perspective view of one embodiment of a clamp that may be installed on a panel assembly having a plurality of interconnected panels of the type illustrated in FIGS. 1A-B.

One embodiment of a clamp is illustrated in FIG. 2, is identified by reference numeral 42, and may be used to interconnect any appropriate attachment with a panel assembly defined by a plurality of interconnected panels of the type illustrated in FIGS. 1A-B, as well as panels having a different trapezoidal rib profile. The clamp 42 generally includes a first clamping member 46 and a second clamping member 82 that are engageable with opposite sides of a rib 18 of a panel assembly. Generally, the second clamping member 82 pivots relative to the first clamping member 46 by activating one or more clamping fasteners 110 (e.g., bolts) of the clamp 42 to secure the clamp 42 to the rib 18. The clamp 42 also includes what may be characterized as a mounting fastener 112 (e.g., a bolt) that may be used to secure an attachment to the clamp 42, thereby interconnecting the attachment with the panel assembly.

The first clamping member 46 includes a first section 50, a second section 62, and a third section 66. Although the first clamping member 46 may be formed from any appropriate material and formed in any appropriate manner, in one embodiment the first clamping member 46 is an extruded metal (e.g., aluminum/aluminum alloy). The first section 50, second section 62 and third section 66 could be separately formed and thereafter joined in the noted configuration. More preferably, the first clamping member 46 is of an integral construction, with no joint of any kind between the first section 50 and the second section 62, and with no joint of any kind between the second section 62 and the third section 66. Regardless of the construction, the first clamping member 46 is a rigid structure with little to no relative movement between any of the sections 50, 62, 66.

The first section 50 of the first clamping member 46 is disposed at least generally parallel with the reference plane 34 when the clamp 42 is installed on a panel assembly having a plurality of interconnected panels 10, and cantilevers from the second section 62 of the first clamping member 46. However, the first section 50 could be disposed in other orientations. The first section 50 includes a first surface 54 that faces or projects toward the panel assembly when the clamp 42 is installed on the panel assembly in the illustrated embodiment, and further that includes a concave, arcuately-shaped recess 58 that preferably extends along the full length of the clamp 42. This recess 58 could be at any appropriate location on the first clamping member 46. Oppositely disposed from this first surface 54 is a second surface 56 that is preferably flat or planar for interfacing with an attachment to be mounted to the clamp 42. In this regard, the first section 50 further includes one or more threaded bores 78 on the second surface 56 and that extend at least toward the first surface 54. That is, each such threaded bore 78 may extend only partially through the first section 50, but more preferably extends completely through the first section 50. One or more mounting fasteners 112 may be threadably engaged with a corresponding threaded bore 78, for instance to mount an attachment to the clamp 42. It should be appreciated that one or more mounting fasteners 112 may be installed on the first clamping member 46 for any purpose. The mounting fastener(s) 112 preferably extends completely through the first section 50 of the first clamping member 46 and does not use a nut to retain the fastener(s) 112 on the first clamping member 46.

Any appropriate number of mounting fasteners 112 may be mounted on the first section 50 of the first clamping member 46. Multiple threaded bores 78 may be provided on the first section 50 to accommodate multiple mounting fasteners 112. Another option would be for the first section 50 to not initially include any threaded bores 78. In this case, the mounting fastener(s) 112 could be in the form of a self-drilling/self-tapping screw or the like. That is, a threaded engagement is somehow provided between the first section 50 of the first clamping member 46 and each associated mounting fastener 112, either prior to the engagement of a particular mounting fastener 112 with the first section 50 or as a result of such an engagement.

The second section 62 of the first clamping member 46 extends from the first section 50 in the direction of the underlying panel assembly. The first section 50 and the second section 62 of the first clamping member 46 are thereby disposed in different orientations. Generally, the second section 62 disposes the first section 50 in spaced relation to the underlying panel assembly. In one embodiment, the first section 50 and second section 62 define an included angle α that is within a range of about 90 degrees to about 95 degrees. Other relative angular relationships may be appropriate. Moreover, in the illustrated embodiment the first section 50 in effect cantilevers from an upper end of the second section 62. The first section 50 could extend in the opposite direction to that illustrated in FIG. 2 (FIG. 7), or could extend in the direction illustrated in FIG. 2, plus in the opposite direction (FIG. 8).

A pair of bores 74 extend through the second section 62 of the first clamping member 46 for receiving the clamping fasteners 110. Any number of bores 74 could be utilized, including a single bore. However, multiple bores 74 are preferred to reduce the potential of the clamp 42 being "pulled off" the panel assembly. In the illustrated embodiment, the bores 74 are not threaded and have a diameter that is at least slightly larger than a diameter of the shaft of the corresponding clamping fastener 110 to facilitate the installation of the clamp 42 on a panel assembly. That is, each bore 74 is oversized in relation to the shaft of its corresponding clamping fastener 110. Generally, this size difference allows for at least some relative movement between the clamping fasteners 110 and the first clamping member 46 in more than one dimension (e.g., other than along an axis that the shaft of the clamping fasteners 110 extend), which may be a benefit while securing the clamp 42 to a panel assembly. However, each clamping fastener 110 will be simultaneously engaged with both the first clamping member 46 (e.g., possibly only via its head) and the second clamping member 82 (e.g., via a threaded engagement) when the clamp 42 is exerting at least an inwardly directed force on both sides of the rib 18, and possibly including a force component that is "upwardly" directed as well.

The third section 66 of the first clamping member 46 extends from the second section 62 at least generally along one of the sides of the rib 18 when the clamp 42 is installed on a panel assembly. The second section 62 and the third section 66 of the first clamping member 46 are disposed in different orientations. A head or catch 70 is formed on the third section 66 for interfacing with the rib 18 and defines a distal end of the first clamping member 46. Although the head 70 is located on the distal end of the third section 66 in the illustrated embodiment, such need not be the case. One potential function of the head 70 is to exert a clamping force on the rib 18 (e.g., inwardly-directed, and possibly also upwardly directed or at least generally in the direction of the top wall 30 of the rib 18) to retain the clamp 42 on the panel assembly. Another function of the head 70 is to engage the rib 18 in a manner that provides lift-off resistance for the clamp 42 when installed on a panel assembly. Other portions of the first clamping member 46 may exert these types of forces on the rib 18 as well.

The second clamping member 82 interfaces with the opposite side of the rib 18 in comparison to the first clamping member 46. Generally, the rib 18 is "clamped" between the first clamping member 46 and the second clamping member 82 of the clamp 42. The second clamping member 82 includes a fourth section 86 and a fifth section 94 that are disposed in different orientations. The second clamping member 82 is at least generally the mirror image of the second section 62 and the third section 66 of the first clamping member 46. Although the second clamping member 82 may be formed from any appropriate material and formed in any appropriate manner, in one embodiment the second clamping member 82 is an extruded metal (e.g., aluminum/aluminum alloy). The fourth section 86 and fifth section 94 could be separately formed and thereafter joined in the noted configuration. More preferably, the second clamping member 82 is of an integral construction, with no joint of any kind between the fourth section 86 and the fifth section 94. Regardless of the construction, the second clamping member 46 is a rigid structure with little to no relative movement between any of the sections 86, 94.

The fourth section 86 of the second clamping member 82 includes a distal end 90 that engages the first surface 54 of the first section 50 of the first clamping member 46. This distal end 90 is convex and arcuately-shaped for interfacing with the recess 58 on the first surface 54 of the first section 50 of the first clamping member 46. The distal end 90 and recess 58 preferably have matching contours. In one embodiment, the distal end 90 associated with the second clamping member 82 is defined by a first radius, and the recess 58 associated with the first clamping member 46 is defined by a second radius that is only slightly larger than the first radius to allow the second clamping member 82 to pivot relative to the first clamping member 46 when securing the clamp 42 to a rib 18 of a panel assembly as will be discussed in more detail below. That is, the recess 58 and the distal end 90 preferably cooperate to allow the second clamping member 82 to pivot about a single axis relative to the first clamping member 46. Other ways of pivotally interconnecting the first clamping member 46 and the second clamping member 82 to exert an "inwardly directed" force on opposite sides of a rib 18 could be utilized. The second clamping member 82 may include a convex projection at a different location than disclosed herein for interfacing with the recess 58 of the first clamping member 46.

The fourth section 86 of the second clamping member 82 extends from the first surface 54 of the first section 50 of the first clamping member 46 in the direction of the underlying panel assembly. A pair of threaded bores 102 extend at least within, and more preferably through, the fourth section 86 for receiving the clamping fasteners 110. That is, the clamping fasteners 110 threadably engage with the second clamping member 82. Although the clamping fasteners 110 could be self-drilling/self-tapping, preferably the threaded bores 102 on/through the second clamping member 82 exist before installation of the clamping fasteners 110.

The fifth section 94 of the second clamping member 82 extends from the fourth section 86 at least generally along one of the sides of a rib 18 when the clamp 42 is installed on a panel assembly. The fourth section 86 and the fifth section 94 are disposed in different orientations. A head or catch 98 is formed on the fifth section 94 for interfacing with the rib 18 and defines a distal end of the second clamping member 82. Although the head 98 is located on the distal end of the fifth section 94 in the illustrated embodiment, such need not be the case. One potential function of the head 98 is to exert a clamping force on the rib 18 (e.g., inwardly-directed, and possibly also an upwardly directed or at least generally in the direction of the top wall 30 of the rib 18) to retain the clamp 42 on the panel assembly. Another function of the head 98 is to engage the rib 18 in a manner that provides lift-off resistance for the clamp 42 when installed on a panel assembly. Other portions of the second clamping member 82 may exert these types of forces on the rib 18 as well.

The first clamping member 46 and the second clamping member 82 at least generally diverge away from each other proceeding away from the first section 50 of the first clamping member 46. Activation of the clamping fastener(s) 110 will cause the second clamping member 82 to pivot relative to the first clamping member 46 to cause both the first clamping member 46 and the second clamping member 82 to exert a force on a rib 18 on which the clamp 42 is being mounted, where this force has at least a component that is inwardly directed, but where the force may also have a component that is upwardly directed as well and as will be discussed in more detail below.

Figure 3:
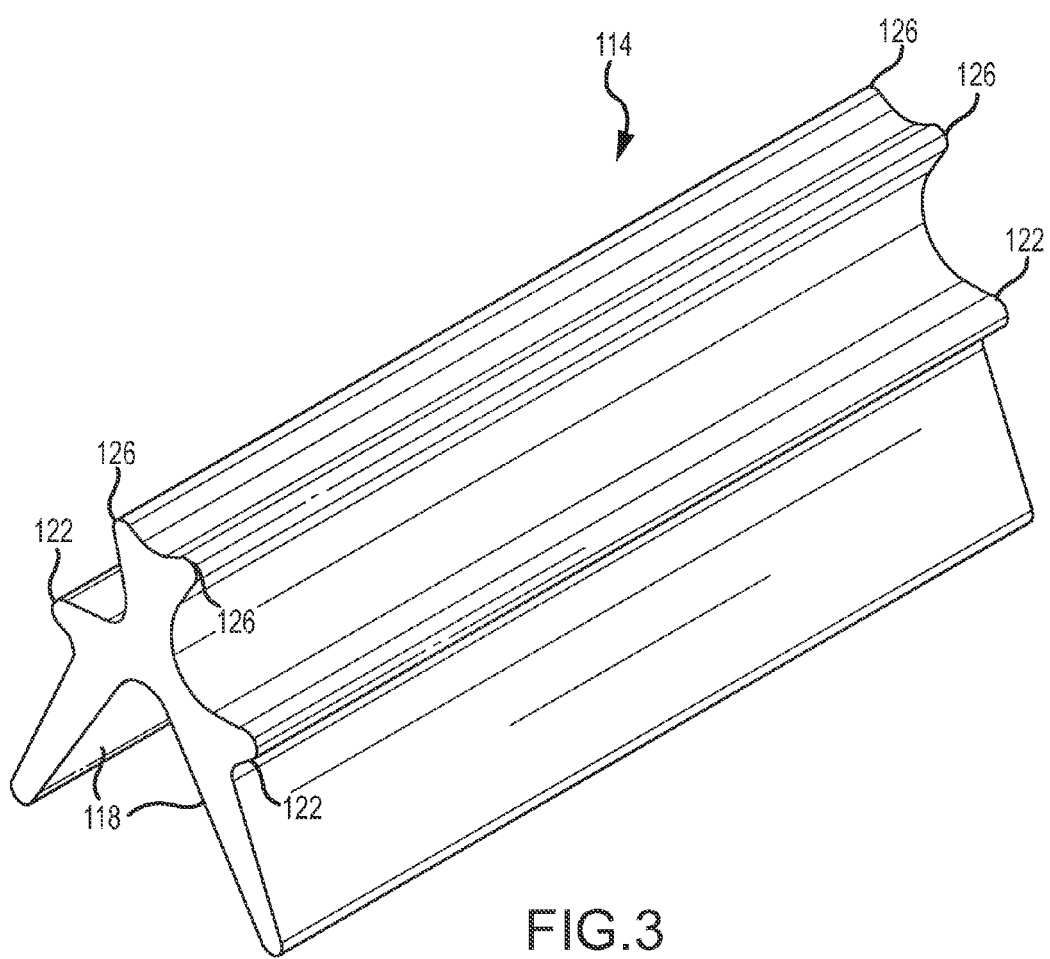
FIG. 3 is a perspective view of one embodiment of an insert that may be used in the installation of the clamp of FIG. 2 on a panel assembly having a plurality of interconnected panels of the type illustrated in FIGS. 1A-B.

One embodiment of an insert is illustrated in FIG. 3, is identified by reference 114, and may be used in the installation of the clamp 42 of FIG. 2 on a rib 18 of a panel assembly. Generally, the insert 114 may be disposed within the hollow interior 20 of the rib 18 to reduce the potential for the rib 18 collapsing when securing the clamp 42 to the rib 18 (e.g., to allow increased "clamping" forces to be used to mount the clamp 42 on a rib 18). In this regard, the clamp 42 may be disposed on a rib 18 at the location of the insert 114 such that the rib 18 is in effect "sandwiched" between the clamp 42 and the insert 114. Stated another way, the clamp 42 may be mounted on a rib 118 in overlying relation to the insert 114. The insert 114 may be formed from any appropriate material and in any appropriate manner, although extruded metal is preferred (e.g., aluminum or an aluminum alloy). It is envisioned that the length of the insert 114 should be such that the entire length of a corresponding clamp 42 will be opposed by the insert 114. This may mean that the insert 114 will be substantially longer than the length of its corresponding clamp 42 in one or more embodiments.

The insert 114 includes a pair of legs 118, a pair of side protrusions 122, and a pair of top protrusions 126. The legs 118 engage opposite sides of a rib 118 when disposed within its hollow interior 20. The side protrusions 122 interact with the rib 18 directly above the location of the indentation 28 on the corresponding side of the rib 18 in order to retain the insert 114 within the hollow interior 20 of the rib 18 even before the clamp 42 is fully secured to the rib 18. In this regard and as more clearly illustrated in FIG. 5, the side protrusions 122 would be vertically offset to match the vertical offset of the indentations 28 of a rib 18 formed by two sides 32 of two panels 10, whereas an insert 114 for a rib 18 formed by a single panel 10 would have the side protrusions 122 disposed at the same elevation (not shown, but see FIG. 1B for the profile of the "center" rib 18 of a panel 10). The top protrusions 126 engage the top wall 30 of the rib 18 at spaced locations for purposes of supporting the top wall 30 of the rib 18. Other configurations may be appropriate for the insert 114 for use in combination with the clamp 42, for instance depending upon the configuration of the rib of a panel assembly on which the clamp 42 is to be installed. Generally, the insert 114 should be of a configuration that adequately supports the rib 18 in relation to a clamp 42 being mounted on the rib 18. Although the insert 114 provides this function with the added benefit of reducing the amount of material required to fabricate the insert 114, the insert 114 could simply be in the form of a "solid" that occupied the entire hollow interior 20 of the rib 18 and still provide the above-noted supporting function.

Figure 4A:
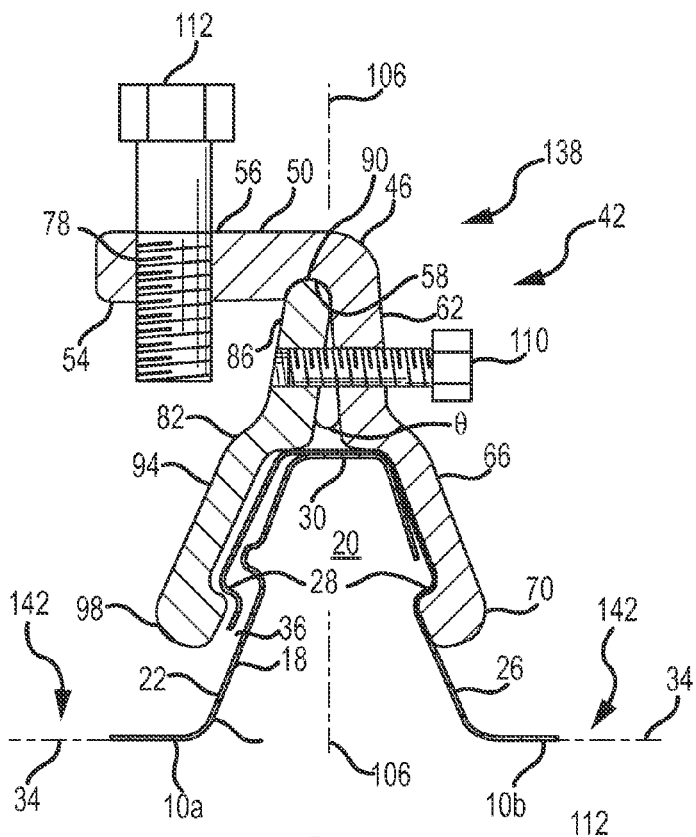
FIG. 4A is an end view of one embodiment of a clamp/panel assembly that includes a panel assembly having a plurality of interconnected panels of the type illustrated in FIGS. 1A-B, as well as the clamp of FIG. 2 as it would be initially mounted on a hollow rib associated with the panel assembly.
Figure 4B:
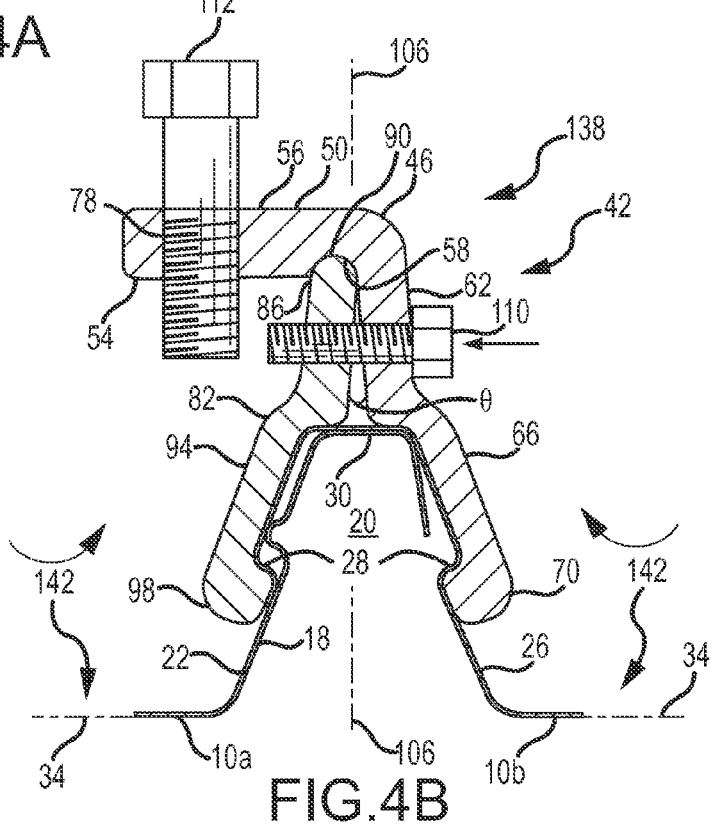
FIG. 4B is an end view of the clamp/panel assembly of FIG. 4A after the clamp has been secured to the hollow rib of the panel assembly.

The insert 114 may not be required in all instances when mounting the clamp 42 on a rib 18 of a panel assembly. FIGS. 4A-B provides one example of a clamp/panel assembly 138 that includes a clamp 42 mounted on a panel assembly 142 having at least a first panel 10a and a second panel 10b that are interconnected to define a rib 18 and that are each of the construction of the panel 10 illustrated in FIGS. 1A-B. The clamping fasteners 110 are preferably only partially engaged with their corresponding threaded bore 102 when the clamp 42 is initially positioned on the rib 18 and prior to being fully "clamped" thereto (FIG. 4A). Another option would be to separately position the first clamping member 46 and the second clamping member 82 relative to the rib 18, and to then direct the clamping fasteners 110 through the bores 74 of the first clamping member 46 and into the threaded bores 102 of the second clamping member 82. In any case, at this time the distal end 90 of the second clamping member 82 is disposed within the recess 58 of the first clamping member 46, the first clamping member 46 and the second clamping member 82 are each typically disposed on and supported by the top wall 30 of the rib 18 (generally at the transition between the second section 62 and the third section 66 of the first clamping member 46, and generally at the transition between the fourth section 86 and the fifth section 94 of the second clamping member 82), and the heads 98, 70 of the clamp 42 are aligned with the indentations 28 on the first sidewall 26 and second sidewall 22, respectively, of the rib 18. The included angle $\theta$ between the first clamping member 46 and second clamping member 82 is of a first magnitude in the "less than fully clamped" configuration of FIG. 4A.

Increasing the amount of engagement between the clamping fasteners 110 and the threaded bores 102 of the second clamping member 82 causes the second clamping member 82 to pivot relative to the first clamping member 46 at least generally about an axis corresponding with the recess 58 to decrease the magnitude of the included angle θ between the first clamping member 46 and second clamping member 82 (compare FIGS. 4A-4B). There may be a gap between the second section 62 of the first clamping member 46 and the fourth section 86 of the second clamping member 82 when the clamp 42 is engaging the rib 18 with the desired degree of "clamping" force (i.e., the included angle θ will be greater than zero in this instance). However, the second section 62 of the first clamping member 46 and the fourth section 86 of the second clamping member 82 may be disposed in interfacing relation when the clamp 42 is engaging the rib 18 with the desired degree of "clamping" force (not shown, but where the included angle θ has a value of zero). This second option may be used as a way of controlling the maximum amount of inwardly-directed force that the clamp 42 can exert on the rib 18 (e.g., to prevent "over-tightening" of the clamping fasteners 110). Typically the second section 62 and third section 66 of the first clamping member 46 will be symmetrically disposed relative to the second clamping member 82 when the clamp 42 is fully engaged with the rib 18 (e.g., FIG. 4B). Stated another way, the second section 62 and third section 66 of the first clamping member 46 and the entire second clamping member 82 will be disposed in at least the same general orientation relative to a reference plane 106 that is perpendicular to the reference plane 34 associated with the panel assembly 142 and disposed between the first clamping member 46 and the second clamping member 82, although the noted portions of the first clamping member 46 will of course be the mirror image of the second clamping member 82. Typically the included angle θ between the first clamping member 46 and second clamping member 82 will be reduced to at least partially compress (inwardly and toward, but not to, a collapsed condition) the rib 18 (note, for instance, the existence of the space 36 in the FIG. 4A configuration, and the alleviation of the same in the FIG. 4B configuration). Again, the included angle θ may actually be reduced to zero.

At least one of, and typically both of, the first clamping member 46 and the second clamping member 82, will exert a force on the rib 18 that at least attempts to retain the clamp 42 on the rib 18. The pivoting action utilized by the clamp 42 is believed to allow both the first clamping member 46 and the second clamping member 82 to exert a desirable force on the rib 18. This force is one having a component that is inwardly directed or toward the reference plane 106, as well as a component that is directed toward a reference plane that contains the top wall 30 of the rib 18. Specifically, the force exerted on the rib 18 by both the first clamping member 46 and the second clamping member 82 is believed to be along an arcuate path as represented by the arrows in FIG. 4B. It may be possible that a purely inwardly-directed force may be appropriate for one or more applications.

Retention of the clamp 42 on the rib 18 is further enhanced by the way in which the clamp 42 interfaces with the first sidewall 26 and second sidewall 22 of the rib 18. That is, the head 70 of the first clamping member 46 is disposed within the indentation 28 on the first sidewall 26 of the rib 18. Similarly, the head 98 of the second clamping member 82 is disposed within the indentation 28 on the second sidewall 22 of the rib 18. The contour of the heads 70, 98 may match the contour of the corresponding indentation 28 or not. In any case, both the first clamping member 46 and the second clamping member 82 include structure that is properly aligned with the indentation 28 on the corresponding sidewall 26, 22, and that extends inwardly toward the reference plane 106 a sufficient distance so that an attempt to pull the clamp 42 away from the rib 18 would be restrained by the clamp 42 being disposed within both indentations 28. Preferably, these structures of the first clamping member 46 and the second clamping member 82 are located such that no or preferably only minimal relative movement is allowed between the clamp 42 and the rib 18 in a direction that would tend to pull the clamp 42 off of the rib 18 (absent, for instance, some type of a failure of the rib 18).

Figure 5:
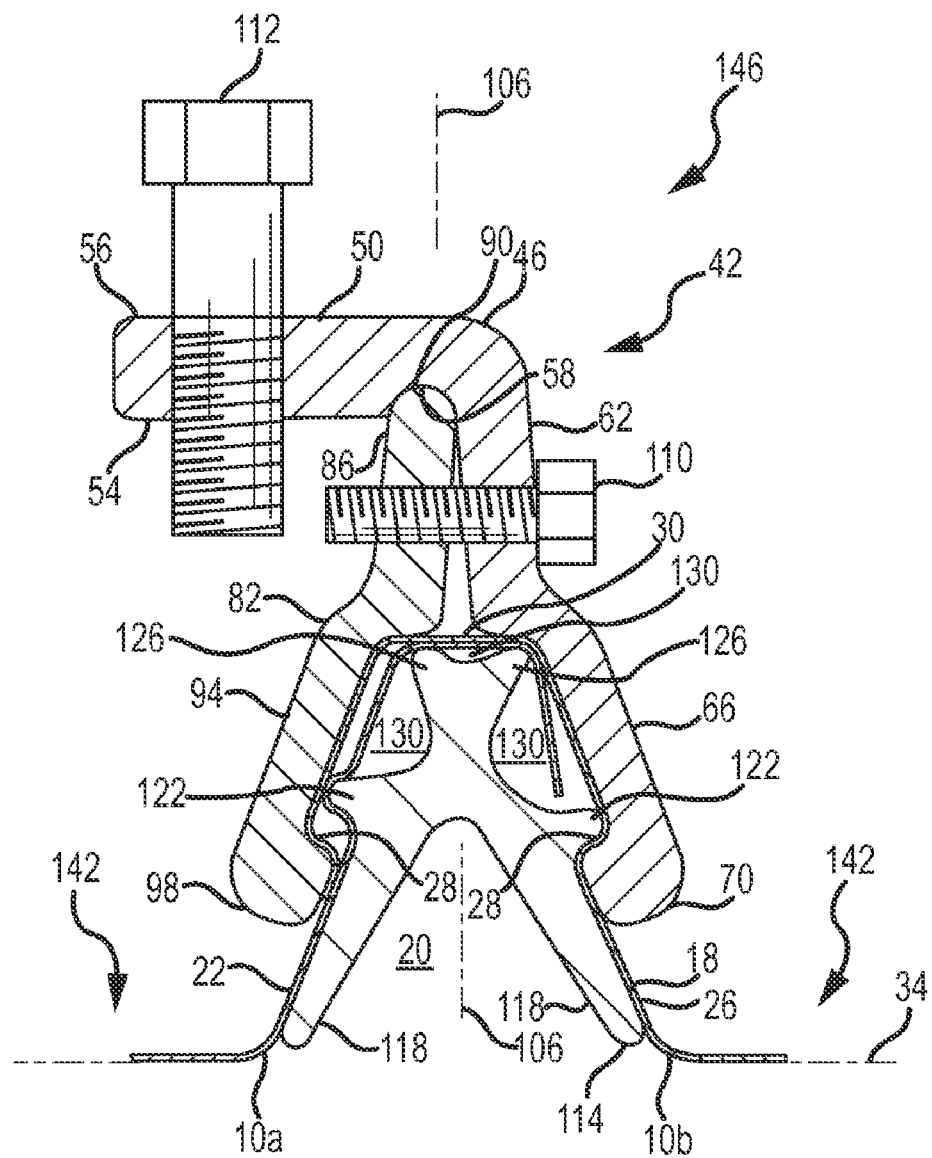
FIG. 5 is an end view of another embodiment of a clamp/panel assembly that includes a panel assembly having a plurality of interconnected panels of the type illustrated in FIGS. 1A-B, the clamp of FIG. 2 mounted on a hollow rib associated with the panel assembly, and the insert of FIG. 3 disposed within a hollow interior of this rib.

FIG. 5 illustrates an example of a clamp/panel assembly 146 where an insert 114 is used in the installation of the clamp 42 on a rib 18 of the panel assembly 142. The insert 114 would typically be disposed within the hollow interior 20 of the rib 18 before the clamp 42 is positioned on the rib 18. One way would be to direct the insert 114 into the hollow interior 20 from the side of the panel assembly 142 opposite that on which the clamp 42 is to be installed. Another option would be for the adjacent panels 10a, 10b to be separated such that the insert 114 may be disposed within the space defined by the side 32 of the panel 10a, and the side 32 of the panel 10b would then be disposed over the side 32 of the panel 10a to define the rib 18.

The configuration of the insert 114 is such that a plurality of openings or spaces 130 are defined between the insert 114 and the rib 18 when the insert 114 is disposed in the hollow interior 20 of the rib 18. These openings 130 are the result of having a configuration for the insert 114 that reduces the amount of material required to provide its function of opposing the clamping forces being exerted on the rib 18 by the clamp 42. In addition, the side protrusions 122 of the insert 114 are disposed within recesses on the interior surface immediately above the location of the indentations 28 on the exterior of the first sidewall 26 and second sidewall 22 of the rib 18. Note that in the case where the rib 18 is defined by the interconnection of the sides 32 of two adjacent panels 10a, 10b, the side protrusions 122 of the insert 114 are vertically offset due to the construction of the panel 10. The side protrusions 122 of the insert 114 would be directly oppositely disposed when installed in the hollow interior 20 of a rib 18 defined solely by one panel 10 (e.g., the rib 18 in FIGS. 1A-B). Again, the particular configuration of the insert 114 may be adapted for the configuration of the rib on which the clamp 42 is being installed, and may in fact occupy the entirety of the hollow interior 20 of the rib 18.

The clamp 42 is installed in the same manner discussed above in relation to FIGS. 4A-4B, and is positioned "over" the insert 114. Since the insert 114 is hidden at the time the clamp 42 is positioned on the rib 18, it may be desirable for the insert 114 to be substantially longer than the clamp 42. That is, preferably the entirety of the clamp 42 is "opposed" by the insert 114 when the clamp 42 is exerting inwardly-directed forces on the rib 18.

The legs 118 of the insert 114 are disposed adjacent the first sidewall 26 and second sidewall 22 of the rib 18 in opposing relation to the heads 70, 98 of the clamping members 46, 82. After at least a certain degree of pivotal movement of the second clamping member 82 relative to the first clamping member 46, the rib 18 will be "clamped" between the heads 70, 98 of the clamp 42 and a corresponding portion of the associated leg 118 of the insert 114. That is, the heads 70, 98 will each be exerting at least an "inwardly directed" force on the rib 18 (e.g., in the direction of the reference plane 106 that bisects the rib 18), as well as possibly an "upwardly directed" force on the rib 18 as discussed above. One leg 118 of the insert 114 may be disposed in interfacing relation with a portion of the first sidewall 26 of the rib 18, while the opposite leg 118 may be disposed in interfacing relation with a portion of the second sidewall 22 of the rib 18. A clamping force may also be exerted on the rib 18 between the first clamping member 46 and the corresponding side protrusion 122 of the insert 114, and between the second clamping member 82 and the corresponding side protrusion 122 of the insert 114. The top protrusions 126 of the insert 114 engage the underside of the top wall 30 of the rib 18 for purposes of supporting the top wall 30 of the rib 18 in at least some manner.

Figure 6:
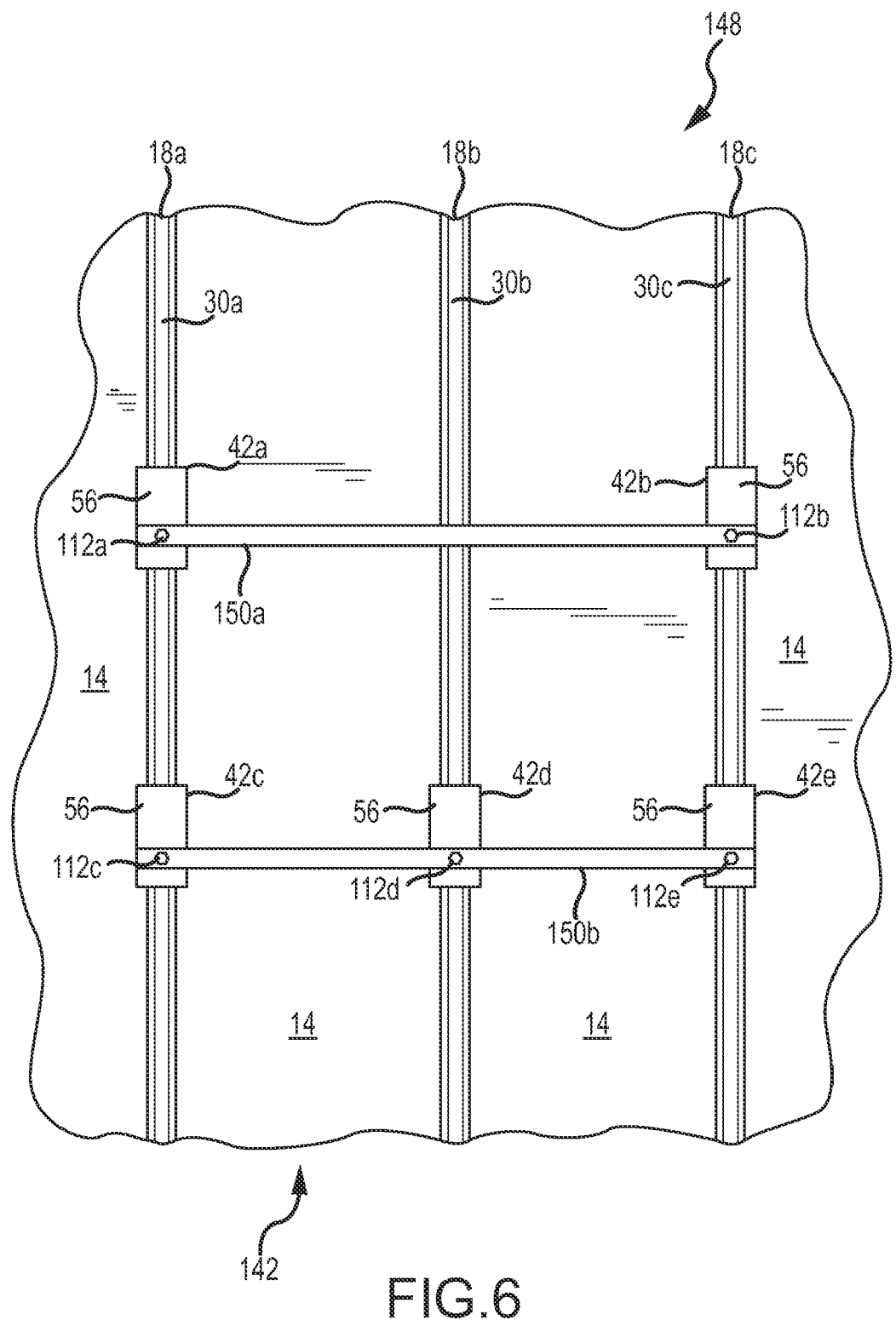
FIG. 6 is a top view of another embodiment of a clamp/panel assembly that includes a panel assembly having a plurality of interconnected panels of the type illustrated in FIGS. 1A-B, a plurality of clamps of the type presented in FIG. 2 mounted on a number of the ribs of the panel assembly, and a pair of attachments mounted on these clamps.

One reason to install one or more clamps 42 on a panel assembly 142 is to interconnect one or more attachments with the panel assembly 142. FIG. 6 illustrates one embodiment of a clamp/panel assembly 148 where a plurality of clamps 42a-e are used to interconnect a pair of attachments 150a, 150b to the panel assembly 142. Any number of clamps may be used to interconnect any number/type of attachments to the panel assembly 142. One or more of the clamps may use an insert 114, one or more of the clamps may be installed without an insert 114, or both.

In the illustrated embodiment, the clamps 42a, 42b are installed on the ribs 18a, 18c (e.g., each being defined by the interconnection of adjacent panels 10). The attachment 150a is mounted on the clamp 42a using a mounting fastener 112a, and is mounted on clamp 42b using a mounting fastener 112b. The clamps 42c, 42e are installed on ribs the 18a, 18c (e.g., each defined by the interconnection of the sides 32 of adjacent panels 10), while the clamp 42b is installed on the rib 18b (e.g., the rib 18 illustrated in FIGS. 1A-B). The attachment 150b is mounted on the clamp 42c using a mounting fastener 112c, is mounted on the clamp 42d using a mounting fastener 112d, and is mounted on the clamp 42e using a mounting fastener 112e.

Figure 9:
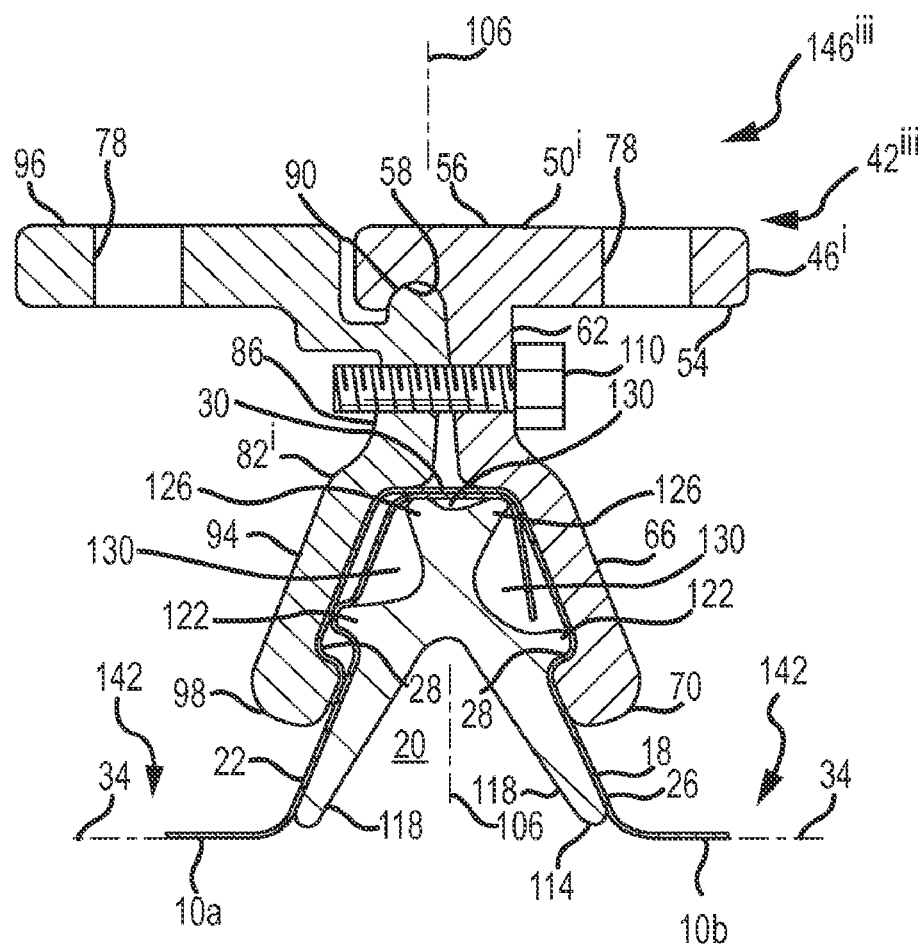

FIGS. 7-9 illustrate variations of the clamp 42 discussed above in relation to FIGS. 1-6. Common components are identified by the same reference numeral, and the discussion presented above remains equally applicable to these embodiments unless otherwise noted. Corresponding components that differ in at least some respect are identified by a "prime" designation. Although these clamps are illustrated in the context of a clamp/panel assembly having an insert 114, such need not be the case.

The clamp/panel assembly $146^i$ of FIG. 7 uses a clamp $42^i$ that differs from the clamp 42 of FIG. 2 in relation to the first clamping member $46^i$, specifically its first section $50^i$. Generally, the first section $50^i$ in the case of the clamp $42^i$ extends in the opposite direction compared to the first section 50 of the clamp 42. All other aspects of the first section 50 discussed herein are equally applicable to the first section $50^i$.

The clamp/panel assembly $146^{ii}$ of FIG. 8 includes a clamp $42^{ii}$ that differs from the clamp 42 of FIG. 2 in relation to the first clamping member $46^{ii}$, specifically its first section $50^{ii}$. Generally, the first section $50^{ii}$ in the case of the clamp $42^{ii}$ extends in both directions from the reference plane 106. One or more threaded bores 78 may be included on the first section $50^{ii}$ on both sides of the reference plane 106. One or more threaded bores 78 could be included on the first section $50^{ii}$ on only one side of the reference plane 106 as well. All other aspects of the first section 50 discussed herein are equally applicable to the first section $50^{ii}$.

The clamp/panel assembly $146^{iii}$ of FIG. 9 includes a clamp $42^{iii}$ that differs from the clamp 42 of FIG. 2 in relation to the first clamping member $46^i$, specifically its first section $50^i$. Generally, the first section $50^i$ in the case of the clamp $42^i$ extends in the opposite direction compared to the first section 50 of the clamp 42. All other aspects of the first section 50 discussed herein are equally applicable to the first section $50^i$.

Another difference between the clamp $42^{iii}$ of FIG. 9 and the clamp 42 of FIG. 2 is in relation to the second clamping member $82^i$. Generally, the second clamping member $82^i$ includes a sixth section 96. This sixth section 96 may have the same attributes as the first section 50 of the first clamping member 50. For instance, the sixth section 96 may include one or more threaded mounting bores 78, may be disposed parallel with the reference plane 34 associated with the base sections 14 of the panel assembly 142, or both. The first section $50^i$ of the first clamping member $46^i$ and the sixth section 96 of the second clamping member $82^i$ may be disposed in co-planar relation as shown, may be parallel to offset (not shown), or may be disposed in different orientations (e.g., disposed in non-parallel relation).

Figure 10:
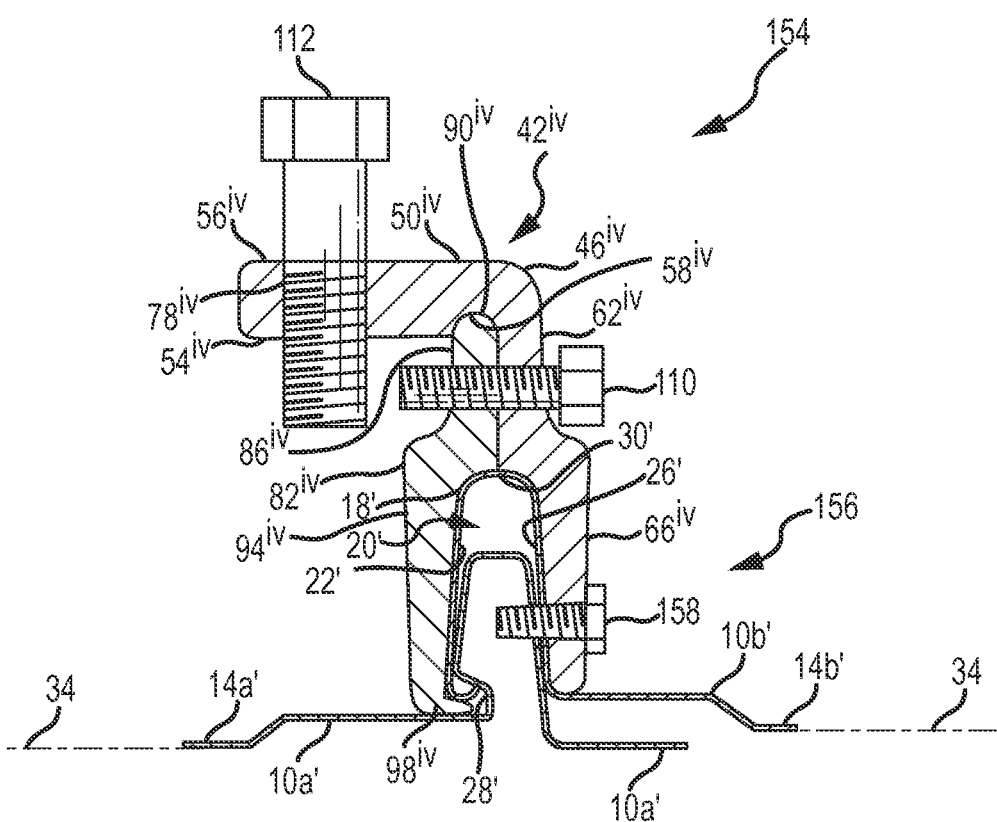
FIG. 10 is another embodiment of a clamp/panel assembly.

The above-noted clamps may be installed trapezoidal rib profiles other than that used by the panel 10 of FIGS. 1A-B. A clamp/panel assembly 154 that utilizes another embodiment of both a clamp $42^{iv}$ and a panel assembly 156 of another trapezoidal-type rib profile is illustrated in FIG. 10. The primary difference between the clamp/panel assembly 154 of FIG. 10 and the clamp/panel assembly 138 of FIGS. 4A-B is that the panel assembly 156 of FIG. 10 only has an indentation on the exterior surface of one sidewall per rib, and therefore the clamp $42^{iv}$ has been modified accordingly. It should be appreciated that the clamp $42^{iv}$ could be used with an insert as in the case of the FIG. 5 embodiment, and could be adapted in the manner of any of the embodiments FIGS. 7-9.

Corresponding components between the panel of FIGS. 1A-B and the panels of FIG. 10 are identified by a common reference numeral, but a "single prime" designation is used in relation to the embodiment of FIG. 10. The panel assembly 156 includes a pair of panels 10a', 10b' that are interconnected to define a rib 18' and that are in the prior art (thereby, the panel assembly 156 is in the prior art). Each panel 10a, 10b may itself include one or more ribs of the same general profile as the rib 18' (not shown), and the clamp $42^{iv}$ may be installed on any of these ribs as well. In any case, the rib 18' projects upwardly from the base sections 14a', 14b', and extends in the longitudinal dimension. Components of the rib 18' include a first sidewall 26' that extends upwardly relative to the adjacent base section 14b', a laterally spaced second sidewall 22' that extends upwardly relative to the adjacent base section 14a' and that is disposed in non-parallel relation with the first sidewall 26', and a top wall 30' that interconnects the first sidewall 26' and second sidewall 22' at a location that is disposed in spaced relation to the base sections 14a', 14b' and the associated reference plane 34. The first sidewall 26', the second sidewall 22', and the top wall 30' collectively define a hollow interior 20' for the rib 18'. This type of rib profile is also commonly referred to in the art as being of a trapezoidal type. The exterior surface of the second sidewall 22' includes a single indentation 28'—no indentation exists on the exterior surface of the first sidewall 26'.

The primary distinctions between the clamp $42^{iv}$ of FIG. 10 and the clamp 42 of FIG. 2, are that: 1) the clamp $42^{iv}$ includes a head $98^{iv}$ on the second clamping member $82^{iv}$ but not on the first clamping member $46^{iv}$—instead, the portion of the first clamping member $46^{iv}$ that faces the rib 18' is a flat surface with no projection of any kind; 2) the head $98^{iv}$ is of a different shape than the head 98 in the case of the FIG. 2 embodiment (to at least generally match the profile of the indentation 28' and facilitate the entry of the head $98^{iv}$ into the indentation 28' (e.g., by being at least somewhat pointed)); and 3) a threaded fastener 158 may be (i.e., not required) directed through the first clamping member $46^{iv}$ (either by being threadably engaged with the first clamping member $46^{iv}$, or without being threadably engaged with the first clamping member $46^{iv}$) and through an aligned portion of the rib 18' (the first sidewall 26'). Otherwise, the discussion presented above is equally applicable to the embodiment of FIG. 10.

All components of the clamp $42^{iv}$ are identified with the superscripted "iv", and use the same reference numeral as their corresponding component in the clamp 42. As such: 1) the clamp $42^{iv}$ includes a first clamping member $46^{iv}$, a second clamping member $82^{iv}$, one or more clamping fasteners 110 (threadably engaged with the second clamping member $82^{iv}$, but not threadably engaged with the first clamping member $46^{iv}$), and at least one mounting fastener 112 (e.g., for mounting an attachment on the clamp $42^{iv}$); 2) the first clamping member $46^{iv}$ includes a first section 50, a second section $62^{iv}$, and a third section $66^{iv}$; 3) the first section $50^{iv}$ of the first clamping member $46^{iv}$ includes an upper surface $50^{iv}$, an oppositely disposed lower surface $54^{iv}$ having a concave, arcuately-shaped recess $58^{iv}$ that preferably extends along the full length of the clamp $42^{iv}$, and one or more threaded bores 78; 4) the second clamping member $82^{iv}$ includes a fourth section $86^{iv}$ and a fifth section $94^{iv}$; and 5) the fourth section $86^{iv}$ of the second clamping member $82^{iv}$ includes a distal end $90^{iv}$ that is disposed within the recess $58^{iv}$ of the first clamping member $46^{iv}$.

Figure 11:
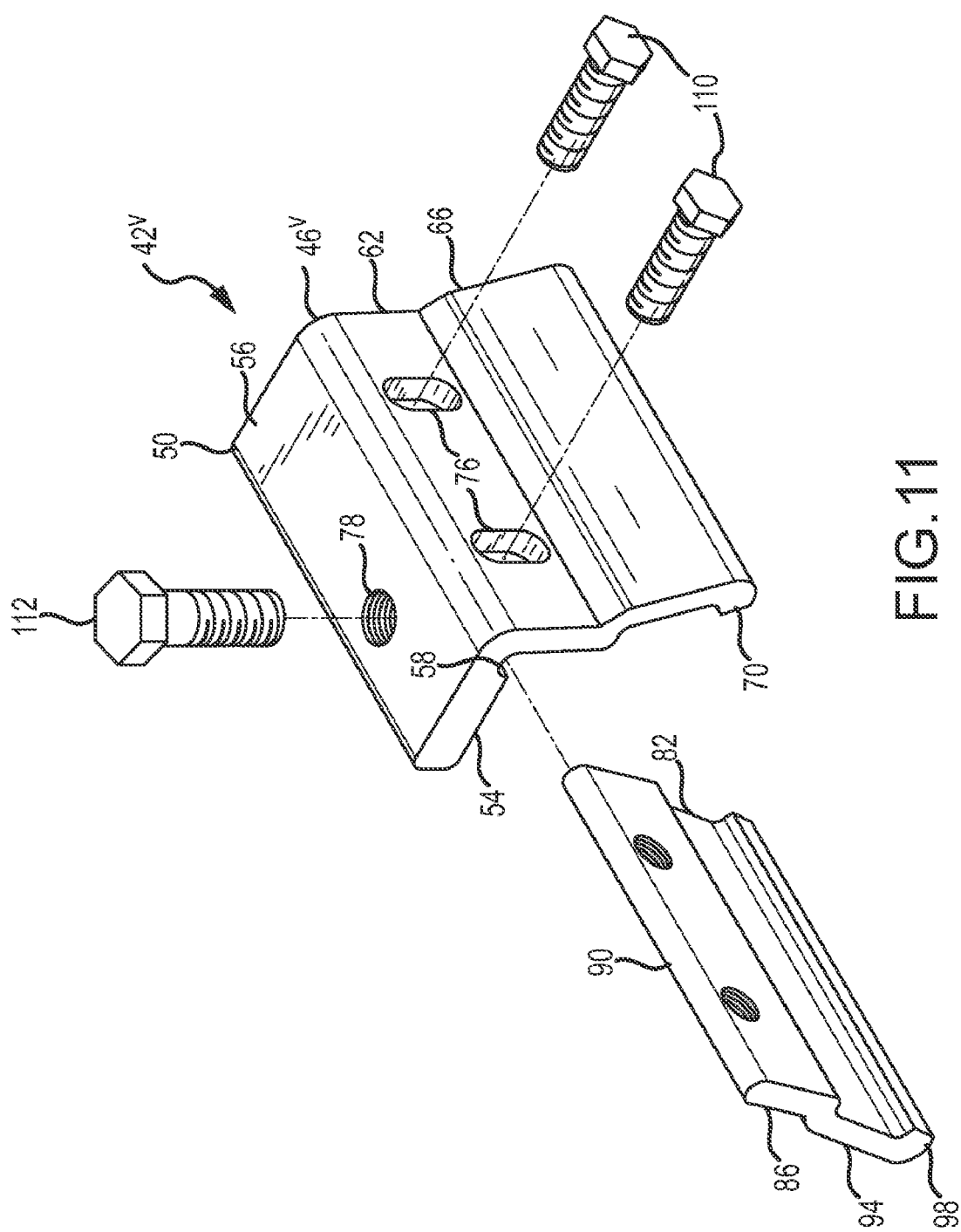
FIG. 11 is another variation of the clamp of FIG. 2.

FIG. 11 illustrates yet another variation of the clamp 42 discussed above in relation to FIGS. 1-6. Common components are identified by the same reference numeral, and the discussion presented above remains equally applicable to this embodiment unless otherwise noted. Corresponding components that differ in at least some respect are identified by an appropriate "prime" designation.

The clamp $42^{v}$ of FIG. 11 differs from the clamp 42 of FIG. 2 in relation to the first clamping member $46^{v}$. Specifically, instead of using "oversized" non-threaded bores 74 (e.g., circular in plan view), the clamp $42^{v}$ uses a non-threaded, elongated slot 76 for each clamping fastener 110 to used by the clamp $42^{v}$. This is the only difference between these two embodiments. As noted above, each clamping fastener 110 will tend to move relative to the first clamping member $46^{v}$ as the clamp $42^{v}$ is being installed by a pivoting of the first clamping member $46^{v}$ relative to the second clamping member 82. The movement is one that changes the orientation of the clamping fastener(s) 110 relative to the first clamping member $46^{v}$. As such, preferably each slot 76 extends along the direction that the corresponding clamping fastener 110 will move when changing orientation during installation of the clamp $42^{v}$. Typically, each slot 76 will be orientated such that it is transverse or perpendicular to the length dimension of a rib on which the clamp $42^{v}$ is installed.

The "width" of each slot 76 is preferably at least slightly larger than the diameter of its corresponding clamping fastener 110, while the length dimension of each slot 76 is preferably greater than its corresponding width dimension to further reduce the potential for its clamping fastener 110 "binding" during installation of the clamp $42^{v}$. Generally, each slot 76 should be sized such that its clamping fastener 110 is able to move along the slot 76 while the second clamping member 82 and the first clamping member $46^{v}$ are being drawn closer together by the above-noted pivoting action and without having the clamping fasteners 110 "bind" on the first clamping member $46^{v}$. Preferably each clamping fastener 110 will still be spaced from the ends of its corresponding slot 76 after the desired clamping forces are being exerted by the clamp $42^{v}$. Any configuration may be used for the slot 76 that allows its corresponding clamping fastener 110 to move without binding during installation of the clamp $42^{v}$. However, it may be desirable to limit the movement of each clamping fastener 110, caused by the pivoting action of the clamp $42^{v}$, to within a reference plane (e.g., having the width of the slot 76 being the same as or only slightly larger than the diameter of its corresponding clamping fastener 110).

The clamp $42^{v}$ of FIG. 11 may be used with or without an insert 114 when being installed on a rib. Moreover, any of the clamps of FIGS. 7-10 discussed above may use the type of slot 76 illustrated in relation to the clamp $42^{v}$ of FIG. 11.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A clamp and panel assembly, comprising:
  a panel assembly comprising a plurality of interconnected panels comprising a plurality of base sections and a plurality of ribs, wherein said plurality of base sections comprises first and second base sections, wherein said plurality of ribs are disposed in spaced relation and comprise a first rib disposed between said first and second base sections, wherein said first rib comprises a first sidewall that extends away from said first base section, as well as a second sidewall that extends away from said second base section; and
  a clamp mounted on said first rib and comprising:
    a first clamping member that engages said first sidewall of said first rib and that also extends beyond said first rib, wherein said first clamping member comprises a mounting flange in the form of a cantilever;
    an attachment mounting fastener threadably engaged with said mounting flange;
    a second clamping member that engages said second sidewall of said first rib and that also extends beyond said first rib, wherein said second clamping member is pivotable relative to said first clamping member, and wherein a first end of said second clamping member engages an underside of said mounting flange; and
    a first fastener located beyond said first rib, associated with each of said first and second clamping members, and in addition to said attachment mounting fastener, wherein activation of said first fastener causes said second clamping member to pivot relative to said first clamping member at least generally about said first end such that said first and second clamping members each exert at least an inwardly-directed force on said first rib.

2. A clamp and panel assembly, as claimed in claim 1, wherein:
  said plurality of ribs are each hollow and substantially trapezoidal.

3. A clamp and panel assembly, as claimed in claim 1, wherein:
  a first reference plane is associated with said plurality of base sections;
  said first and second clamping members are disposed on opposite sides of a second reference plane that is perpendicular to said first reference plane and that extends along a length dimension of said first rib;
  said first clamping member further comprises first, second and third sections, wherein said first section is disposed beyond said first rib, is disposed at least generally parallel with said first reference plane, and comprises said mounting flange, wherein said second section extends from said first section toward said first reference plane in a first orientation relative to said second reference plane and is also disposed beyond said first rib, and wherein said third section extends from said second section toward said first reference plane in a second orientation relative to said second reference plane and engages said first sidewall of said first rib, wherein said first and second orientations are different; and said second clamping member further comprises fourth and fifth sections, wherein said fourth section is disposed beyond said first rib and extends toward said first reference plane in a third orientation relative to said second reference plane, and wherein said fifth section extends from said fourth section toward said first reference plane in a fourth orientation relative to said second reference plane and engages said second sidewall of said first rib, wherein said third and fourth orientations are different, and wherein said fourth and fifth sections of said second clamping member are at least generally a mirror image of said second and third sections of said first clamping member.

4. A clamp and panel assembly, as claimed in claim 1, wherein:

said underside of said mounting flange of said first clamping member comprises a recess that is concave and arcuately-shaped, and wherein said first end of said second clamping member comprises a first projection that is convex and arcuately-shaped, and further that is disposed in said recess of said first clamping member to provide a pivotal connection of said second clamping member to said first clamping member.

5. A clamp and panel assembly, as claimed in claim 1, wherein:

said second sidewall comprises a second indentation on an exterior surface of said first rib, and wherein said second clamping member comprises a second head disposed in said second indentation.

6. A clamp and panel assembly, as claimed in claim 5, wherein:

said first sidewall comprises a first indentation on said exterior surface of said first rib, and wherein said first clamping member comprises a first head disposed in said first indentation.

7. A clamp and panel assembly, as claimed in claim 5, wherein:

said first sidewall is free of any indentations on said exterior surface of said first rib.

8. A clamp and panel assembly, as claimed in claim 7, wherein:

said clamp further comprises a second fastener that extends through said first clamping member and through an aligned portion of said first sidewall of said first rib.

9. A clamp and panel assembly, as claimed in claim 1, further comprising:

an attachment mounted on said first clamping member.

10. A clamp and panel assembly, as claimed in claim 9, wherein:

said mounting flange of said first clamping member comprises a threaded bore, wherein said attachment mounting fastener extends through said attachment and at least into said threaded bore to mount said attachment to said first clamping member.

11. A clamp and panel assembly, as claimed in claim 10, wherein:

said threaded bore extends completely through said mounting flange of said first clamping member, wherein said attachment mounting fastener extends completely through said threaded bore, and wherein said attachment mounting fastener lacks a nut for retaining said attachment mounting fastener on said first clamping member.

12. A clamp and panel assembly, as claimed in claim 1, wherein:

one of said first and second clamping members comprises a non-threaded bore, wherein the other of said first and second clamping members comprises a threaded bore, and wherein said first fastener extends through said non-threaded bore and at least into said threaded bore.

13. A clamp and panel assembly, as claimed in claim 12, wherein:

said first fastener extends completely through each of said first and second clamping members, wherein said first fastener lacks a nut for retaining said first fastener relative to said first and second clamping members.

14. A clamp and panel assembly, as claimed in claim 1, wherein:

one of said first and second clamping members comprises a non-threaded slot, wherein the other of said first and second clamping members comprises a threaded bore, and wherein said first fastener extends through said non-threaded slot and at least into said threaded bore.

15. A clamp and panel assembly, as claimed in claim 1, further comprising:

an insert disposed within a hollow interior of said first rib, wherein said clamp is mounted on said first rib in overlying relation to said insert such that said first rib is disposed between said clamp and said insert.

16. A clamp and panel assembly, comprising:

a panel assembly comprising a plurality of interconnected panels comprising a plurality of base sections and a plurality of ribs, wherein said plurality of base sections comprises first and second base sections that are contained within a first reference plane, wherein said plurality of ribs are disposed in spaced relation and comprise a first rib disposed between said first and second base sections, wherein said first rib comprises a first sidewall that extends away from said first base section, a second sidewall that extends away from said second base section, and a top wall that interconnects said first and second sidewalls and that is disposed in spaced relation to said first and second base sections; and a clamp mounted on said first rib and comprising:

a first clamping member comprising first, second, and third sections that are disposed in different orientations to each other, wherein said second section extends beyond said first rib in a direction that is away from said first reference plane that contains said first and second base sections such that said second section is positioned above said top wall of said first rib, wherein said third section extends from said second section in a direction of said first reference plane and engages said first sidewall of said first rib, wherein said first section of said first clamping member comprises a mounting flange in the form of a cantilever that extends from said second section of said first clamping member and further extends away from a second reference plane that is both orthogonal to said first reference plane and that extends along a length dimension of said first rib;

an attachment mounting fastener threadably engaged with said mounting flange;

a second clamping member comprising fourth and fifth sections that are disposed in different orientations to each other, wherein said fourth section extends beyond said first rib in a direction that is away from said first reference plane that contains said first and second base sections such that said fourth section is positioned above said top wall of said first rib, wherein said fifth section extends from said fourth section in a direction of said first reference plane and engages said second sidewall of said first rib, wherein said second clamping member is a separate piece from said first clamping member, wherein a first end of said fourth section of said second clamping member engages an underside of said mounting flange of said first clamping member that faces said first reference plane, and wherein said second and third sections of said first clamping member are orientated as a mirror image of said fourth and fifth sections of said second clamping member; and a first fastener located beyond said first rib in a direction that is away from said first reference plane that contains said first and second base sections, that is associated with each of said first and second clamping members, and that is in addition to said attachment mounting fastener, wherein activation of said first fastener causes said first and second clamping members to each exert at least an inwardly-directed force on said first rib, and wherein said first fastener lacks a nut for retaining said first fastener relative to each of said first and second clamping members.

17. The clamp and panel assembly of claim 16, wherein said second sidewall comprises a second indentation on an exterior surface of said first rib, and wherein said second clamping member comprises a second head that is disposed in said second indentation on said second sidewall of said first rib.

18. A clamp and panel assembly, as claimed in claim 17, wherein:
said first sidewall comprises a first indentation on said exterior surface of said first rib, wherein said first clamping member further comprises a first head disposed in said first indentation.

19. A clamp and panel assembly, as claimed in claim 18, wherein:
said first and second heads are each convexly-shaped.

20. A clamp and panel assembly, as claimed in claim 16, wherein:
said first rib is hollow and substantially trapezoidal.

21. A clamp and panel assembly, as claimed in claim 16, wherein:
said first sidewall comprises a first indentation on an exterior surface of said first rib, wherein said first clamping member further comprises a first head disposed in said first indentation.

22. A clamp and panel assembly, as claimed in claim 16, wherein:
activation of said first fastener causes said second clamping member to pivot relative to said first clamping member.

23. A clamp and panel assembly, as claimed in claim 16, wherein:
said underside of said mounting flange of said first clamping member comprises a recess that is concave and arcuately-shaped, and wherein said first end of said second clamping member comprises a first projection that is convex and arcuately-shaped, and further that is disposed in said recess of said first clamping member, wherein said activation of said first fastener causes said second clamping member to move relative to said first clamping member at least generally about said first projection.

24. A clamp and panel assembly, as claimed in claim 16, wherein
said first sidewall is free of any indentation on an exterior surface of said first rib.

25. A clamp and panel assembly, as claimed in claim 16, wherein:
said clamp further comprises a second fastener that extends through said first clamping member and through an aligned portion of said first sidewall.

26. A clamp and panel assembly, as claimed in claim 16, wherein said mounting flange is spaced further from said first reference plane that contains said first and second base sections than an uppermost extreme of said first rib.

27. A clamp and panel assembly, as claimed in claim 16, wherein said mounting flange is parallel with said first reference plane.

28. A clamp and panel assembly, as claimed in claim 16, wherein said first end of said second clamping member engages said underside of said mounting flange at a location that is spaced further from said first reference plane than an uppermost extreme of said first rib.

29. A clamp and panel assembly, as claimed in claim 16, wherein said first fastener extends through one of said first and second clamping members and is threadably engaged with the other of said first and second clamping members.

30. A clamp and panel assembly, comprising:
a panel assembly comprising a plurality of interconnected panels comprising a plurality of base sections and a plurality of ribs, wherein said plurality of base sections comprises first and second base sections, wherein said plurality of ribs are disposed in spaced relation and comprise a first rib disposed between said first and second base sections, wherein said first rib comprises a first sidewall that extends away from said first base section, as well as a second sidewall that extends away from said second base section; and
a clamp mounted on said first rib and comprising:
a first clamping member that engages said first sidewall of said first rib and comprises a first section that is disposed beyond said first rib, and wherein said first section comprises a mounting flange in the form of a cantilever;
an attachment mounting fastener threadably engaged with said mounting flange;
a second clamping member that engages said second sidewall of said first rib, that extends beyond said first rib, and that comprises a first end that engages an underside of said mounting flange of said first clamping member; and
a first fastener located beyond said first rib, associated with each of said first and second clamping members, and in addition to said attachment mounting fastener, wherein activation of said first fastener retains said first and second clamping members on said first rib, wherein:
a first reference plane is associated with said plurality of base sections;
said first and second clamping members are disposed on opposite sides of a second reference plane that is perpendicular to said first reference plane and that extends along a length dimension of said first rib;
said first clamping member further comprises second and third sections, wherein said first section is disposed at least generally parallel with said first reference plane, wherein said second section extends from said first section toward said first reference plane in a first orientation relative to said second reference plane and is also disposed beyond said first rib, and wherein said third section extends from said second section toward said first reference plane in a second orientation relative to said second reference plane and engages said first sidewall of said first rib, wherein said first and second orientations are different; and said second clamping member further comprises fourth and fifth sections, wherein said fourth section is disposed beyond said first rib and extends toward said first reference plane in a third orientation relative to said second reference plane, and wherein said fifth section extends from said fourth section toward said first reference plane in a fourth orientation relative to said second reference plane and engages said second sidewall of said first rib, wherein said third and fourth orientations are different, and wherein said fourth and fifth sections of said second clamping member are at least generally a mirror image of said second and third sections of said first clamping member.

31. A clamp and panel assembly, as claimed in claim 30, wherein:
said first fastener lacks a nut for retaining said first fastener relative to each of said first and second clamping members.

32. A clamp and panel assembly, as claimed in claim 30, wherein:
said first section of said first clamping member is at least generally parallel with said first base section.

33. A clamp and panel assembly, as claimed in claim 30, wherein:
said second sidewall comprises a second indentation on an exterior surface of said first rib, and wherein said second clamping member comprises a second head disposed in said second indentation.

34. A clamp and panel assembly, as claimed in claim 33, wherein:
said first sidewall comprises a first indentation on said exterior surface of said first rib, and wherein said first clamping member comprises a first head disposed in said first indentation.

35. A clamp and panel assembly, as claimed in claim 33, wherein:
said first sidewall is free of any indentations on said exterior surface of said first rib.

36. A clamp and panel assembly, as claimed in claim 35, wherein:
said clamp further comprises a second fastener that extends through said first clamping member and through an aligned portion of said first sidewall of said first rib.

37. A clamp and panel assembly, as claimed in claim 30, further comprising:
an attachment mounted on said first section of said first clamping member.

38. A clamp/panel-clamp and panel assembly, as claimed in claim 37, wherein:
said attachment mounting fastener extends through said attachment and at least into a first threaded bore on said mounting flange to mount said attachment to said first section of said first clamping member.

39. A clamp and panel assembly, as claimed in claim 38, wherein:
said first threaded bore extends completely through first section of said first clamping member, wherein said attachment mounting fastener extends completely through said first threaded bore, and wherein said first threaded fastener lacks a nut for retaining said first threaded fastener on said first clamping member.

40. A clamp and panel assembly, as claimed in claim 30, wherein:
one of said first and second clamping members comprises a non-threaded bore, wherein the other of said first and second clamping members comprises a threaded bore, and wherein said first fastener extends through said non-threaded bore and at least into said threaded bore.

41. A clamp and panel assembly, as claimed in claim 40, wherein:
said first fastener extends completely through each of said first and second clamping members, wherein said first fastener lacks a nut for retaining said first fastener relative to said first and second clamping members.

42. A clamp and panel assembly, as claimed in claim 30, wherein:
one of said first and second clamping members comprises a non-threaded slot, wherein the other of said first and second clamping members comprises a threaded bore, and wherein said first fastener extends through said non-threaded slot and at least into said threaded bore.

43. A clamp and panel assembly, as claimed in claim 30, further comprising:
an insert disposed within a hollow interior of said first rib, wherein said clamp is mounted on said first rib in overlying relation to said insert such that said first rib is disposed between said clamp and said insert.

* * * * *